United States Patent
Sharma et al.

(10) Patent No.: US 10,728,132 B2
(45) Date of Patent: Jul. 28, 2020

(54) NETWORK AFFINITY INDEX INCREASE

(71) Applicant: Hewlett Packard Enterprise Development LP, Houston, TX (US)

(72) Inventors: Puneet Sharma, Palo Alto, CA (US); Christian Sieber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 206 days.

(21) Appl. No.: 15/611,095

(22) Filed: Jun. 1, 2017

(65) Prior Publication Data

US 2018/0351843 A1 Dec. 6, 2018

(51) Int. Cl.
*H04L 12/26* (2006.01)
*H04L 12/46* (2006.01)
*H04L 12/24* (2006.01)
*G06F 9/455* (2018.01)

(52) U.S. Cl.
CPC ...... *H04L 43/0894* (2013.01); *H04L 12/4641* (2013.01); *H04L 41/0896* (2013.01); *H04L 43/062* (2013.01); *G06F 2009/45595* (2013.01)

(58) Field of Classification Search
CPC ............... H04L 43/0894; H04L 43/062; H04L 12/4641; H04L 41/0896; G06F 2009/45595
See application file for complete search history.

(56) References Cited

U.S. PATENT DOCUMENTS

| | | | |
|---|---|---|---|
| 9,363,180 B2 * | 6/2016 | Beliveau | H04L 45/38 |
| 9,384,028 B1 | 7/2016 | Felstaine et al. | |
| 9,558,041 B2 * | 1/2017 | Vadkerti | G06F 9/45558 |
| 9,762,402 B2 * | 9/2017 | Batz | H04L 12/1407 |
| 9,800,673 B2 * | 10/2017 | Parikh | H04L 67/16 |
| 10,069,694 B1 * | 9/2018 | Schwartz | H04L 43/50 |
| 10,116,571 B1 * | 10/2018 | Bertz | H04L 67/38 |
| 10,445,339 B1 * | 10/2019 | Mistry | H04L 43/08 |
| 2014/0188906 A1 * | 7/2014 | Muller | G06F 16/2282 707/752 |
| 2015/0082308 A1 | 3/2015 | Kiess et al. | |
| 2015/0124622 A1 * | 5/2015 | Kovvali | H04W 28/0215 370/236 |
| 2015/0207586 A1 * | 7/2015 | Xia | H04J 14/0269 398/48 |
| 2015/0288541 A1 * | 10/2015 | Fargano | H04L 43/08 709/225 |

(Continued)

OTHER PUBLICATIONS

Addis, B. et al.; "Virtual Network Functions Placement and Routing Optimization"; 2015; 8 pages.

(Continued)

*Primary Examiner* — Blake J Rubin
(74) *Attorney, Agent, or Firm* — Hewlett Packard Enterprise Patent Department (57) ABSTRACT

Examples herein relate to identifying a placement of a virtual network function (VNF) to increase a network affinity index. For example a method, executable by a network controller, determines for the VNF the network affinity index over a period of time. The network affinity index identifies a number of packets received by the VNF from a data locality corresponding to a processing unit hosting the VNF. The method proceeds to identify a placement of the VNF extrinsic to the processing unit hosting the VNF to increase the network affinity index.

17 Claims, 6 Drawing Sheets

(56) References Cited

U.S. PATENT DOCUMENTS

| | | | |
|---|---|---|---|
| 2015/0326535 A1 | 11/2015 | Rao et al. | |
| 2015/0355946 A1* | 12/2015 | Kang | G06F 9/5072 |
| | | | 718/104 |
| 2016/0057075 A1* | 2/2016 | Parikh | H04L 47/788 |
| | | | 709/226 |
| 2016/0092270 A1* | 3/2016 | Uniyal | G06F 9/505 |
| | | | 718/104 |
| 2016/0127169 A1* | 5/2016 | Rosa de Sousa Teixeira | |
| | | | H04L 41/5025 |
| | | | 370/216 |
| 2016/0134474 A1* | 5/2016 | Strassner | H04L 41/0816 |
| | | | 709/223 |
| 2016/0188474 A1* | 6/2016 | Wang | G06F 12/0842 |
| | | | 711/119 |
| 2016/0205004 A1* | 7/2016 | Chou | H04L 43/08 |
| | | | 709/224 |
| 2016/0234077 A1* | 8/2016 | Rottenstreich | H04L 47/12 |
| 2016/0248860 A1* | 8/2016 | Dunbar | H04L 67/16 |
| 2016/0253350 A1* | 9/2016 | Moulik | G06F 16/2365 |
| | | | 707/694 |
| 2016/0315876 A1* | 10/2016 | Sinha | H04L 47/828 |
| 2016/0321112 A1* | 11/2016 | Iwashina | G06F 9/5072 |
| 2017/0019302 A1* | 1/2017 | Lapiotis | H04L 41/145 |
| 2017/0026235 A1* | 1/2017 | Famaey | G06F 9/5077 |
| 2017/0026301 A1* | 1/2017 | Keller | H04L 47/621 |
| 2017/0048165 A1* | 2/2017 | Yu | H04L 47/82 |
| 2017/0078216 A1* | 3/2017 | Adolph | H04L 12/4641 |
| 2017/0134287 A1* | 5/2017 | Shaw | H04L 47/125 |
| 2017/0134520 A1* | 5/2017 | Abbasi | H04L 67/32 |
| 2017/0141944 A1* | 5/2017 | Lee | H04L 41/0866 |
| 2017/0170990 A1* | 6/2017 | Gaddehosur | H04L 12/4675 |
| 2017/0187572 A1* | 6/2017 | Wu | H04L 29/08 |
| 2017/0214608 A1* | 7/2017 | Jilani | H04L 45/566 |
| 2017/0223530 A1* | 8/2017 | Marquardt | H04W 12/06 |
| 2017/0230733 A1* | 8/2017 | Rana | H04L 67/10 |
| 2017/0257276 A1* | 9/2017 | Chou | H04L 41/0823 |
| 2017/0272380 A1* | 9/2017 | Rao | H04L 47/823 |
| 2017/0277531 A1* | 9/2017 | McGrath | G06F 8/65 |
| 2017/0279687 A1* | 9/2017 | Muntes-Mulero | H04L 41/145 |
| 2017/0279735 A1* | 9/2017 | Yousaf | G06F 9/5077 |
| 2017/0288971 A1* | 10/2017 | Jayaraman | H04L 41/12 |
| 2017/0300352 A1* | 10/2017 | Lou | H04L 41/5054 |
| 2017/0305352 A1* | 10/2017 | Bouaziz | B60R 1/078 |
| 2017/0315839 A1* | 11/2017 | Zhang | G06F 9/4856 |
| 2017/0337074 A1* | 11/2017 | Tsirkin | G06F 9/45558 |
| 2017/0371717 A1* | 12/2017 | Kiess | G06F 9/5077 |
| 2018/0006898 A1* | 1/2018 | Kanza | H04L 41/145 |
| 2018/0013656 A1* | 1/2018 | Chen | H04W 24/04 |
| 2018/0026858 A1* | 1/2018 | Zhang | H04L 41/00 |
| | | | 709/226 |
| 2018/0070298 A1* | 3/2018 | Kothari | H04W 48/18 |
| 2018/0121222 A1* | 5/2018 | Sharma | G06F 9/45558 |
| 2018/0123870 A1* | 5/2018 | Xue | H04L 41/00 |
| 2018/0145904 A1* | 5/2018 | Alleman | H04L 45/64 |
| 2018/0152507 A1* | 5/2018 | Rosenberg | H04L 41/0803 |
| 2018/0173547 A1* | 6/2018 | Stokes | G06F 8/60 |
| 2018/0176886 A1* | 6/2018 | Kodaypak | H04W 76/10 |
| 2018/0246750 A1* | 8/2018 | Maria | G06F 9/45558 |
| 2018/0287902 A1* | 10/2018 | Chitalia | H04L 43/045 |
| 2018/0288622 A1* | 10/2018 | Maria | H04W 16/14 |
| 2018/0302343 A1* | 10/2018 | Lokman | H04L 49/70 |
| 2018/0316594 A1* | 11/2018 | Wu | H04L 45/02 |
| 2018/0317133 A1* | 11/2018 | Sciancalepore | H04W 16/02 |
| 2018/0329735 A1* | 11/2018 | Liu | G06F 9/45558 |
| 2018/0352038 A1* | 12/2018 | Sathyanarayana | H04L 67/16 |
| 2018/0367460 A1* | 12/2018 | Gao | G06F 9/5066 |
| 2019/0014005 A1* | 1/2019 | Lessmann | H04L 41/0893 |
| 2019/0026168 A1* | 1/2019 | Qiu | G06F 9/546 |
| 2019/0034244 A1* | 1/2019 | Yang | H04L 41/5054 |

OTHER PUBLICATIONS

Mehraghdam, S. et al,; "Specifying and Placing Chains of Virtual Network Functions"; Jun. 4, 2014; 7 pages.

Huawei Tech (UK) Co et al., "Network Functions Virtualisation (NFV); Management and Orchestration; Functional Requirements Specification," ETSI GS NFV-IFA 010ed231 V2.2.2, May 2017, 56 pages.

Lange, S. et al.; "Heuristic Approaches to the Controller Placement Problem in Large Scale SDN Networks"; Feb. 10, 2015; 4 pages.

* cited by examiner

NETWORK AFFINITY INDEX INCREASE

BACKGROUND

Network Functions Virtualization (NFV) involves replacing expensive and inflexible network hardware with network services that operate virtually on commodity hardware. NFV increases resource efficiency usage and deployment of new services in a network. The deployment of these new services within the NFV system refers to the implementation of virtualized network functions (VNFs) using software decoupled from the underlying hardware. The VNFs are responsible for handling specific network functions that run on a virtual machine in the NFV system.

BRIEF DESCRIPTION OF THE DRAWINGS

In the accompanying drawings, like numerals refer to like components or blocks. The following detailed description references the drawings, wherein.

DETAILED DESCRIPTION

Virtualized network functions (VNFs) as described herein, includes those network functions and/or network services that are performed in a virtualized manner. Accordingly, VNFs are considered network functions which may have formerly been executed on dedicated hardware. The VNFs are those virtualized tasks in which a service carrier injects a service and/or function between nodes during packet transportation. VNFs include, by way of example, internal tracking, load balancer, firewalls, network address translation, inspection, deep packet inspection (DPI), encryption, decryption, quality of service (QoS), network forwarding policy, layer 4-7 switching, IP forwarding, virtual LAN switching, among many others.

To perform packet processing and VNF execution within the NFV system, packets are rerouted to those networking devices that host the VNFs. Rerouting the packets to those network devices hosting the VNFs may introduce much latency and errors as the NFV system may include architectural limitations. For example, upon receiving a packet in by a processor in one memory zone, a controller may copy the packet to another memory zone associated with another processor hosting the VNF. Copying the packet over to the different memory zone associated with the different processor ensures the packet is properly routed but introduces overhead. The overhead includes increasing latency and decreasing the overall efficiency in the network system. As such, due to the architecture limitations and rerouting packets, the NFV system may not be optimized for high-speed packet processing.

The present disclosure provides a controller that optimizes placement of the VNF on a specific core within service such that the placement reduces the copying of packets between the various memory zones. Reducing the copying of the packets between the memory zones also reduces the processing latency associated with the packet processing. The controller calculates a memory zone efficiency and based on this calculation, the controller identify a different placement for the VNF that increases the memory zone efficiency.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for identifying a placement of a virtualized network function (VNF) to increase a network affinity index. The disclosed examples may include systems, devices, computer-readable storage media, and methods for increasing the network affinity index. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Figure 1:
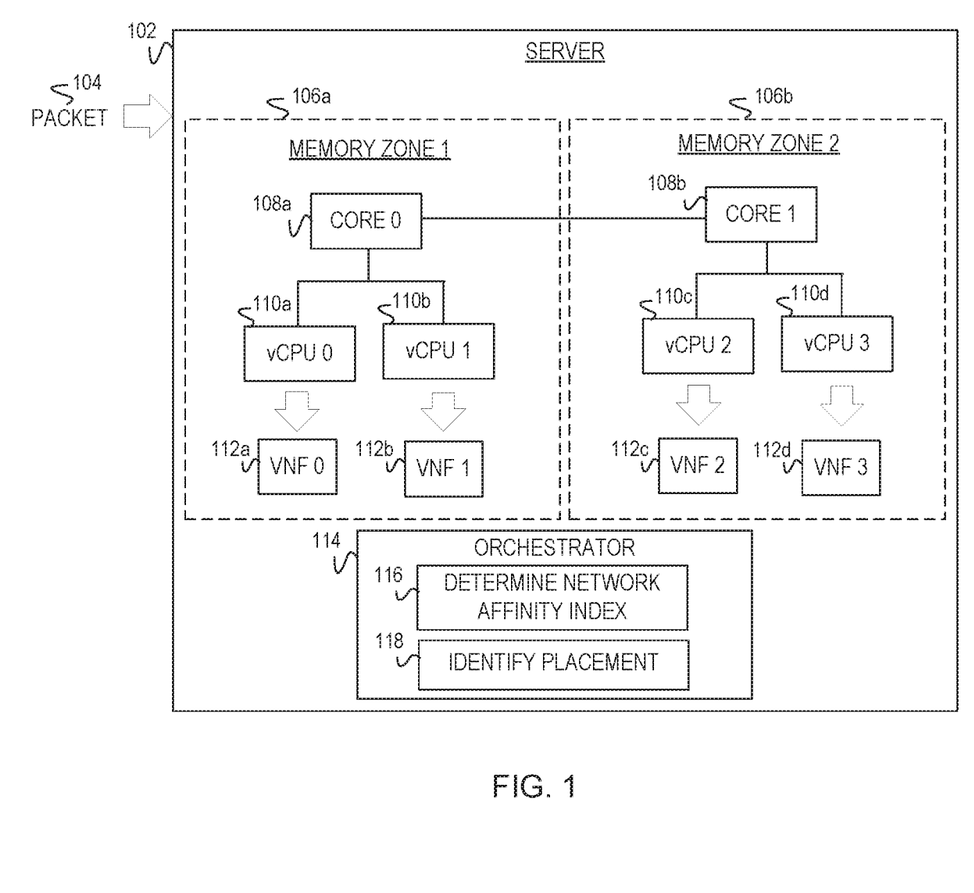
FIG. 1 illustrates an example server including an orchestrator to increase a network affinity index via placement of a VNF from one memory zone to another memory zone in accordance with the present disclosure.

FIG. 1 illustrates an example server 102 to receive packet 104 and providing to memory zones 106a-106b. Memory zones 106-106b include memory cores 108a-108b which allocate respective processing units 110a-110d to host corresponding VNFs 112a-112d. Orchestrator 114 operates in conjunction with server 102 to determine a network affinity index for a given VNF among VNFs 112a-112d and in turn, identifies a placement for the given VNF among processing units 110a-110d to increase the network affinity index. The network affinity index is a measure of efficiency for the given VNF. Measuring the network affinity index, orchestrator 114 may relocate the given VNF among processing units 110a-110d in server 102. Server 102 includes a computing device such as a database server, mail server, file server, domain name system (DNS) server, print server, web server, game server, application server, telecommunications server, cartridge server, blade server, catalog server, communication server, home server, media server, proxy server, or other type of computing device capable of receiving packets and performing network function services at processing unit 110a-110d. Although FIG. 1 illustrates server 102, memory zones 106a-106b, and orchestrator 114, implementations should not be limited as this was done for illustration purposes. For example, FIG. 1 may include a network card that receives packet 104 for queueing to a particular processing unit 110a-110d to be processed by a given VNF 112a-112d. This implementation is explained in detail in a later figure.

To provide more context over FIG. 1, assume packets from a network card (not illustrated) are delivered to the particular processing unit 110b (vCPU 1) which belongs to memory core 108a (Core 0) in memory zone 106a (Memory Zone 1). Assume the packets may be routed for servicing to VNF 112c (VNF 2) located in memory zone 106b (Memory Zone 2), thus the packets may be copied between to the memory zones 106a-106b. The copying between memory zones 106a-106b increase latency and overall efficiency. To combat these efficiency issues, orchestrator 114 determines the network affinity index for a given VNF and identifies where to relocate the given VNF so the packets arrive on the processing unit 110a-110d in the memory zone 106a-106b hosting the given VNF. Taking into account the network affinity index optimizes the location of the given VNF to the different processing units 110a-110d such that the memory zone in closer proximity to the processing unit hosting the given VNF and thus increases the overall efficiency.

Memory zones 106a-106b represent the caching architecture of server 102. As such, memory zones 106a-106b may comprise non-uniform memory access (NUMA) zones where the access to a given VNF among VNFs 112a-112d depends on the memory location relative to processing units 110a-110d. Within each memory zone 106a-106b includes cores 108a-108b that may queue packets for processing units 110a-110d that are hosting given VNFs 112a-112d. In implementations, memory zones 106a-106b are memory locations internal to server 102 that queue packets for assigning to particular processing units 110a-110d depending on which VNF 112a-112d is to service the packets. Accordingly, memory zones 106a-106b include a data locality, NUMA, memory partition, and/or memory location.

Memory cores 108a-108b are units that read and execute a set of instructions to configure processing units 110a-110d to host VNFs 112a-112d. In implementations, memory cores 108a-108b may also include local cache (not illustrated) and represent a set of multiple cores. Memory cores 108a-108b may be similar in structure and functionality to each other and as such, embodiments of memory cores 108a-108b include an execution unit, processing unit, processing node, executing node, or other type of unit capable of queuing packets to a particular processing unit among processing unit 110a-110d hosting the given VNF.

Processing units 110a-110d represent the various components internal to server 102 that hosts at least one of the VNFs 112a-112d. In this manner, the processing units 110a-110d each correspond to the various VNFs 112a-112d. For example, processing unit 110a corresponds to VNF 112a, processing unit 110b corresponds to VNF 112b and so on. In another implementation, processing units 110a-110d comprise virtualized components to host VNFs 112a-112d. In this implementation, each processing unit 110a-110d comprises a virtualized central processing unit that are assigned to virtual machines to host the particular VNF. Yet in a further implementation, processing units 110a-110d may represent the virtual machines hosting VNFs 112a-112d.

VNFs 112a-112d each represent a specific network function that is hosted by processing units 110a-110d within each memory zone 106a-106b. In one implementation, each VNF 112a-112d represents a different network function that may process packets. In this implementation, memory cores 108a-108b queue the packets at the specific processing unit 110a-110d hosting that particular network function. For example, VNF 112a may perform QoS, VNF 112b perform DPI, VNF 112c perform internal tracking, and VNF 112d perform VLAN switching.

Orchestrator 114 measures the network affinity index to identify an optimal placement among processing units 110a-110d for the given VNF as at modules 116-118. Although FIG. 1 illustrates orchestrator 114 as internal to server 102, this was done for illustration purposes as orchestrator 114 may be located externally to server 102. Implementations of orchestrator 114 include, electronic circuitry (i.e., hardware) that implements the functionality of modules 116-118, such an integrated circuit, programmable circuit, application integrated circuit (ASIC), controller, processor, semiconductor, processing resource, chipset, or other type of hardware component capable of the functionality of modules 116-118. Alternatively, orchestrator 114 may include instructions (e.g., stored on a machine-readable medium) that, when executed by a hardware component (e.g., controller and/or processor) determines the network affinity index and repositions the corresponding VNF, accordingly.

At modules 116-118, orchestrator 114 determines the network affinity index for the given VNF. Based on the network affinity index, orchestrator 114 identifies an optimal placement for the given VNF among processing units 110a-110d. In one implementation, the network affinity index is a ratio of the total number of packets received by the given VNF from the particular processing unit hosting that given VNF to the total number of packets received by the VNF over a period of time. Thus, orchestrator 114 may relocate the given VNF. In a further implementation, orchestrator 114 performs a pareto solution to relocate the given VNF to an optimal placement among processing units 110a-110d. Modules 116-118 may include, by way of example, instructions (e.g., stored on a machine-readable medium) that, when executed (e.g., by orchestrator 114), implements the functionality of module 116-118. Alternatively, or in addition, modules 116-118 may include electronic circuitry (i.e., hardware) that implements the corresponding functionality.

Figure 2A:
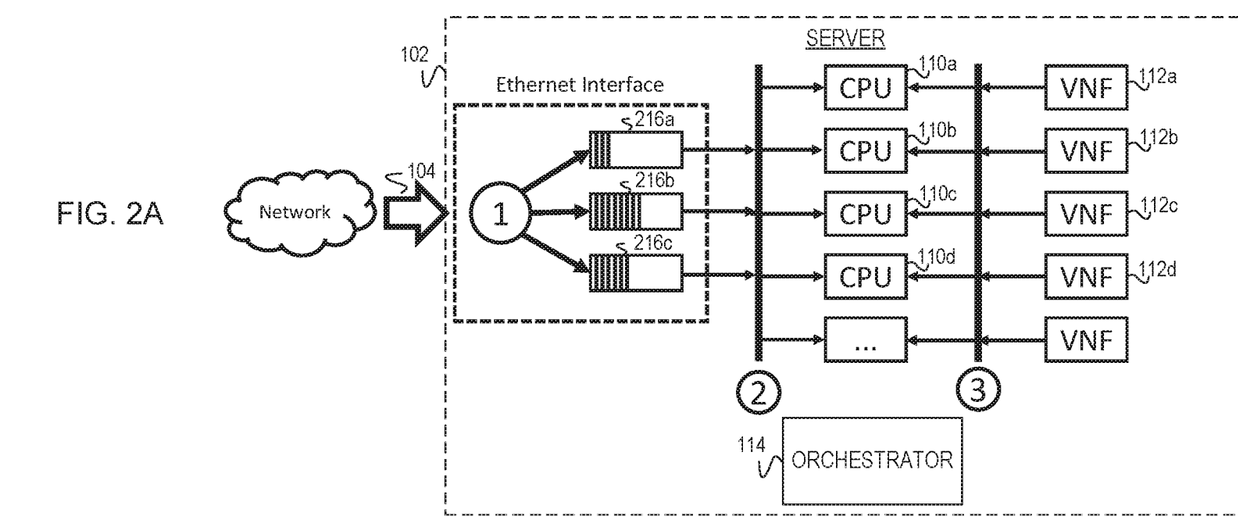
FIGS. 2A-2B illustrate an example server to reposition a VNF to optimize placement in accordance with the present disclosure.

FIG. 2A illustrates a network to distribute traffic, e.g., packets 104 to server 102. Based on receiving packets 104 by server 102, an Ethernet interface distributes the packets 104 to queues 216a-216. Processing units 110a-110d retrieve the packets 104 from queues 216a-216c for processing by VNFs 112a-112d. Orchestrator 114 determines a network affinity index for each VNF 112a-112d at various numbered positions in the networking system. The various numbered positions will be explained in detail later in the figure.

The Ethernet interface receives the incoming packets and distributes the packets to queues 216a-216c based on a hashing algorithm. The hashing algorithm allows orchestrator 114 to determine which queue 216a-216c to place the packet based on where the packets are being transmitted from. The traffic distribution results in specific packets to queue assignment. As such, to optimize the queue assignment, orchestrator 114 proceeds to optimize the network affinity index.

To identify the placement of the given VNF, orchestrator 114 may measure the network affinity index at various position in a networking system. Each of the placements within the networking system is analyzed to configure the optimal packet processing. For example, at (1) the Ethernet interface, the packets are distributed to queues 216a-216c based on source and/or destination header info from each packet. The packets are distributed to queues 216a-216c for processing at various processing unit 110a-110d hosting VNFs 112a-112d. At placement (2), each of the queues 216a-216c is handled by processing units 110a-110d. Processing units 110a-110d retrieves the packets from queue configured to optimize packet handling. At placement (3) VNFs 112a-112d are assigned to one or more processing units 110a-110d based on the packet processing path configuration.

At each of these points, orchestrator 114 may determine network affinity index value. In one implementation, the network affinity index value is measurement over a time period expressing the efficiency of a given VNF. In this implementation, the network affinity index includes a ratio including the number of packet received from a local cache at a particular processing unit to the overall total number of packets received by the VNF. Based on the network affinity index value, orchestrator 114 may proceed to identify an optimal placement of the given VNF among processing units 110a-110d. The optimal placement may be dependent on a number of factors in addition to the network affinity index. The factors may include collected performance metrics of each of VNFs 112a-112d, databased information, configuration information, an admin may choose to add onto server 102, and/other parameters. Using these number of factors and the network affinity index, orchestrator 114 may calculate pareto solution to identify the optimal placement of the given VNF.

Figure 2B:
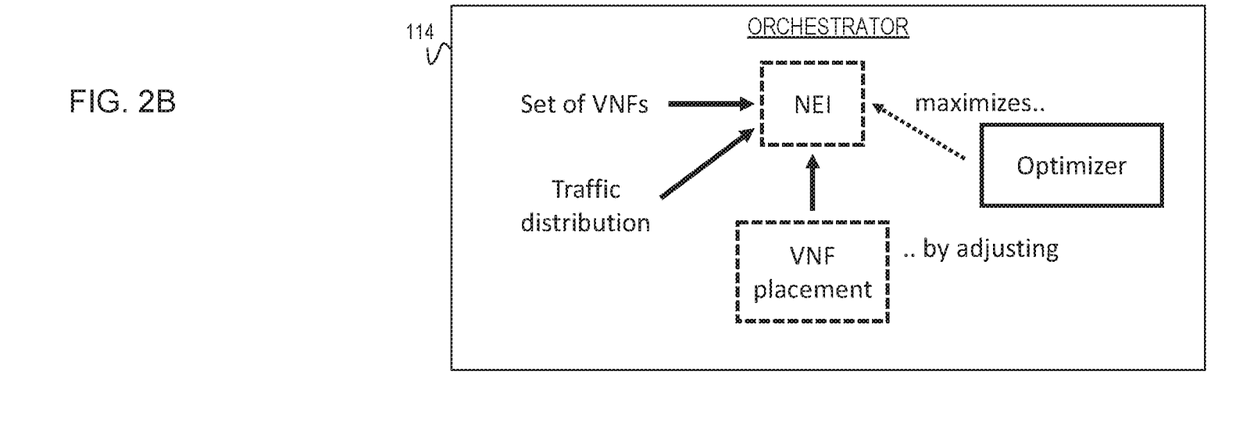

FIG. 2B illustrates an example orchestrator 114 to identify an optimal VNF placement based on a network affinity index value (NEI). To calculate the NEI and select the appropriate processing unit for a given VNF execution, there are various factors that may be considered by orchestrator 114. One such factor may include the set of VNFs that may be used for packet processing, while another factor may include traffic distribution. For example, traffic distribution may change overtime, as such the placement of the given VNF may change as traffic changes over time. For example, a different time of day may change the access patterns to VNFs at different geographical locations. As such, orchestrator 114 may select the appropriate processing unit for the given VNF execution.

To select the optimal processing unit for that given VNF, an optimization formula may be used as indicated the optimizer. The optimizer may use specialized solvers including, but not limited to, Gurobi, CPLEX, etc. In this manner, the NEI may be maximized for each of the VNFs.

In response to identifying the appropriate processing unit for the given VNF execution, orchestrator 114 may proceed to configure the interfaces and parameters for that appropriate processing unit. Upon configuring the appropriate processing unit, orchestrator 114 continues to monitor each VNF for changes or modifications in the VNF environment. This allows orchestrator 114 to continually monitor and re-locate the given VNF to the most optimal processing unit over time.

Figure 3:
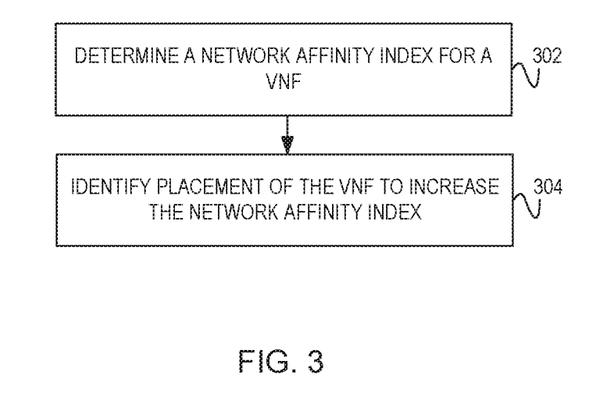
FIG. 3 illustrates an example flow diagram to identify placement of a VNF to increase a network affinity index in accordance with the present disclosure.
Figure 4:
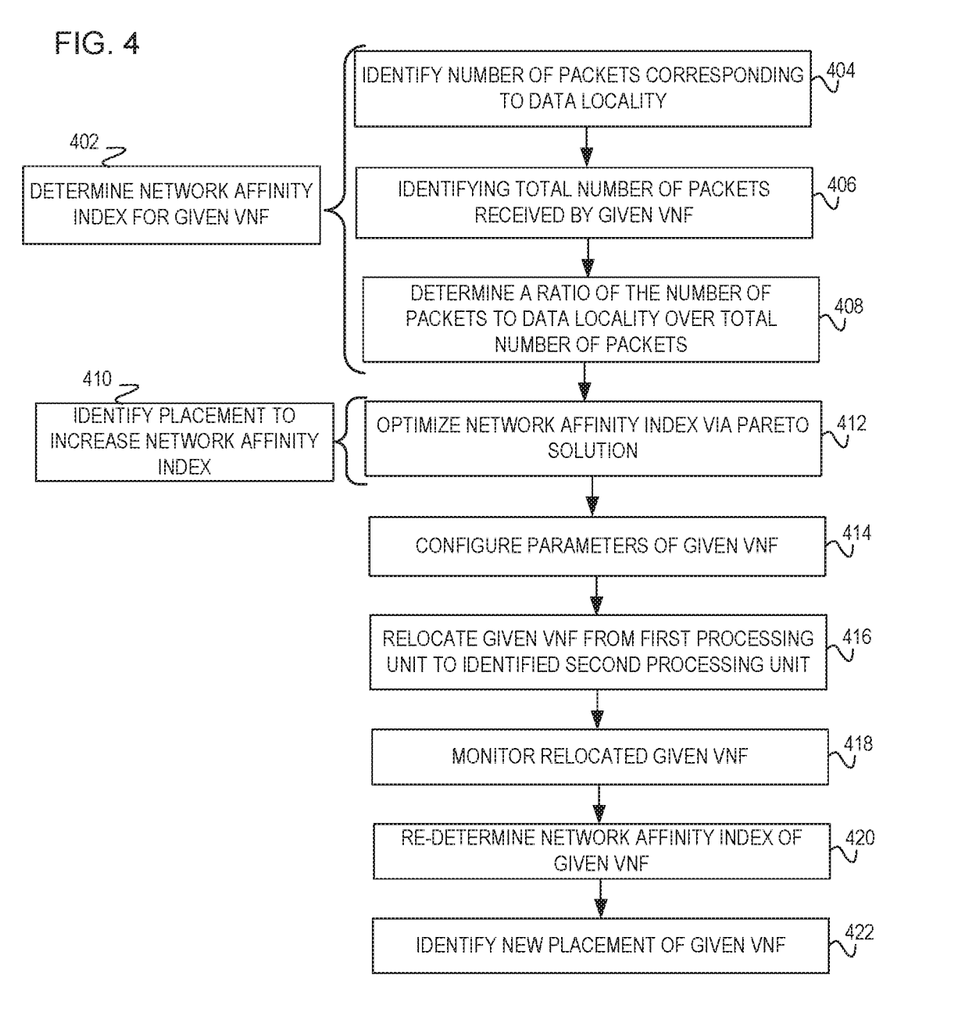
FIG. 4 illustrates an example flow diagram to optimize a network affinity index via placement of a VNF from one processing unit to another processing unit in accordance with the present disclosure.

Referring now to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 3-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 3 is a flow diagram illustrating a method of executable by a network controller to identify a placement of a VNF for increasing a network affinity index. The flow diagram may initially determine the network affinity index for a given VNF. The network affinity index may be calculated based on a number of packets received by the VNF from a specific data locality over a total number of packets received by the VNF. In discussing FIG. 3, references may be made to the components in FIGS. 1-2B to provide contextual examples. In one implementation, orchestrator 104 as in FIG. 1 executes operations 302-304 to increase the network affinity index via identification of the placement of the given VNF. In another implementation, server 102 and orchestrator 104 operate in conjunction to execute operations 302-304. Although FIG. 3 is described as implemented by orchestrator 104, it may be executable on other suitable hardware components. For example, FIG. 3 may be implemented in the form of executable instructions on a machine-readable storage medium 504 and 604 as in FIGS. 5-6.

At operation 302, the network controller determines the network affinity index for a given VNF over a period of time. The network affinity index indicates the efficiency for the given VNF. As such, in implementations, the network affinity index is calculated as the number of packets the given VNF receives from a local processing cache (e.g., data locality) over the total number of packets received by the given VNF. This may include identifying the number of packets from the data locality in proximity to the processing unit hosting the given VNF. This implementation is discussed in detail in later figures. In other implementations, the network affinity index is calculated according to the number of packets received by the given VNF from the data locality remote to the processing unit hosting the given VNF over the total of number of packets received by the given VNF. Yet in further implementations, a different weighting value is placed on the number of packets received by the given VNF from the data locality remote to the processing unit compares to the number of packets from the data area local to the processing unit. In identifying the number of packets from the data locality remote to the processing unit or local to the processing unit, the network controller proceeds to calculate the ration between the number of packets to the overall total number of packets received.

At operation 304 in response to determining the network affinity index, the network controller identifies the placement of the given VNF. At this operation, the network controller proceeds to relocate the VNF from the one processing unit hosting the VNF to another processing unit in closer proximity to the data locality. Identifying and relocating the VNF to the other processing unit increases the network affinity index such that a greater number of packets are received by the given VNF from the local processing unit cache. This allows the given VNF to operate in greater efficiency for processing a higher number of packets. Both processing units are located within the server such that the relocation also occurs within the same server. Although the identification of the placement of the VNF is considered extrinsic to the processing unit currently hosting the given VNF, the newly identified placement is still located within the same server. Identifying the placement of the given VNF maximizes the data locality for that VNF. Upon identifying the placement of the given VNF, the network controller proceeds to configure the parameters of the VNF to relocate to the different processing unit within the same server.

FIG. 4 is a flow diagram illustrating a method of relocating a VNF from one processing unit to another processing until to increase a network affinity index. The method illustrated in FIG. 4 is executable by a network controller, such as an orchestrator to carry out operations 402-422. In discussing FIG. 4, references may be made to the components in FIGS. 1-2B to provide contextual examples. In one implementation, orchestrator 104 as in FIG. 1 executes operations 402-422 to increase the network affinity index via identification of the placement of the given VNF. In another implementation, server 102 and orchestrator 104 operate in conjunction to execute operations 402-422. Although FIG. 4 is described as implemented by orchestrator 104, it may be executable on other suitable hardware components. For example, FIG. 4 may be implemented in the form of executable instructions on a machine-readable storage medium 504 and 604 as in FIGS. 5-6.

At operation 402, the network controller determines the network affinity index for the given VNF. In this implementation, the network controller may proceed to operations 404-408 to identify the ratio of the number of packets by the given VNF from the data locality to the total number of packets received by that given VNF. Operation 402 may be similar in functionality to operation 302 as in FIG. 3.

At operation 404, the network controller identifies the number of packets received from the local cache (e.g., data locality) by the VNF over a period of time. In this implementation, the network controller monitors and counts the packets received by the VNF for the period of time from the local cache. The local cache is considered a memory area local to the processing unit that hosts or runs the VNF. In an implementation rather than identifying the number of packets received from the local cache, the network controller identifies the number of packets from the cache remote to the processing unit. In response to identifying the number of packets from the local cache, the network controller proceeds to identify the total number of packets received over the period of time.

At operation 406, the network controller identifies the total number of packets received by the VNF for the period of time. As such, at operations 404-406, the network controller monitors and counts the number of packets received by the various caches (both local and remote to the processing unit). Identifying and monitoring the packets received by the VNF enables the network controller to identify to network affinity index by calculating the ratio as at operation 408.

At operation 408, the network controller determines the ratio of the number of packets from the local cache obtained at operation 404 to the total number of packets obtained at operation 406. As such the network controller calculates a value of the network affinity index by using both the number of packets identified at operation and the total number of packets at operation 408. This value indicates how efficiently the given VNF is processing packets. Using the value, the network controller identifies a relocation of the given VNF to increase the network affinity index, thus this relocation increases the operational efficiency of the given VNF to process the packets.

At operation 410, the network controller identifies the placement of the given VNF such that the placement relocates the given VNF from running on one processing unit to another processing unit in the same server. Relocating the given VNF from processing units in the same server increases the network affinity index, and thus the operational efficiency of the given VNF. In a further implementation, the network controller may optimize the operational efficiency of the given VNF. The operation efficiency is optimized by identifying the exact placement of the given VNF to maximize the network affinity index. This network affinity index is optimized through the use of a pareto solution as at operation 412. Operation 410 may be similar in functionality to operation 304 as in FIG. 3.

At operation 412, the network controller optimizes the network affinity index through the use of the pareto solution. The pareto solution is considered an optimal state of the location of the VNF to a particular processing unit in the same server. Factors that may be considered in the pareto solution includes the amount of traffic at the given VNF, the period of time, the set of VNFs the packets may be processed by, the server specification, etc. Using these factors in the pareto solution, the network controller is able to identify that processing unit among the various processing units in the same server. Identifying that processing unit, the network controller relocates the given VNF to that processing unit which most effectively processes the packets. Alternatively, this means that maximizing the relocation of the given VNF allows that given VNF to process the packets in a lesser amount of time.

At operation 414 in response to identifying the placement that increase the network affinity index, the network controller configures the parameters of a network card. Configuring the parameters sets the stage for that identified processing unit to host the given VNF. In another implementation upon identifying the optimal location for the given VNF in the server as at operation 412, the network controller uses the interfaces provided by the server operating system to configure the appropriate parameters for the packet distribution function in the network card, such as the Ethernet interface.

At operation 416, the network controller relocates the given VNF from the first processing unit to the second processing unit identified at operations 410-412. Operation 416 may occur simultaneously or in response to configuring the parameters of the network card as at operation 414.

At operation 418, the network controller proceeds to monitor the given VNF hosted by the second processing unit (i.e., relocated processing unit). As such, the network controller monitors the given VNF to track the number of received packets which allows the network controller to re-calculate the network affinity index. Re-calculating the network affinity index over a different period of time, the network controller is able to dynamically relocate the given VNF to another processing unit. Dynamically relocating the given VNF allows that given VNF to more efficiently process the packets at different processing units over different periods of time. For example, for one period of time the given VNF may be located on one processing unit to optimize the network affinity index as the traffic pattern may vary for that one period of time. In another period of time, the VNF may be located to a different processing unit to better optimize the network affinity index.

At operations 420-422, the network controller re-determines or re-calculates the network affinity index and as such identifies the new processing unit in which to relocate the given VNF. Identifying the new processing unit allows the network controller to dynamically select those processing unit locations within the server to optimize the network affinity index.

Figure 5:
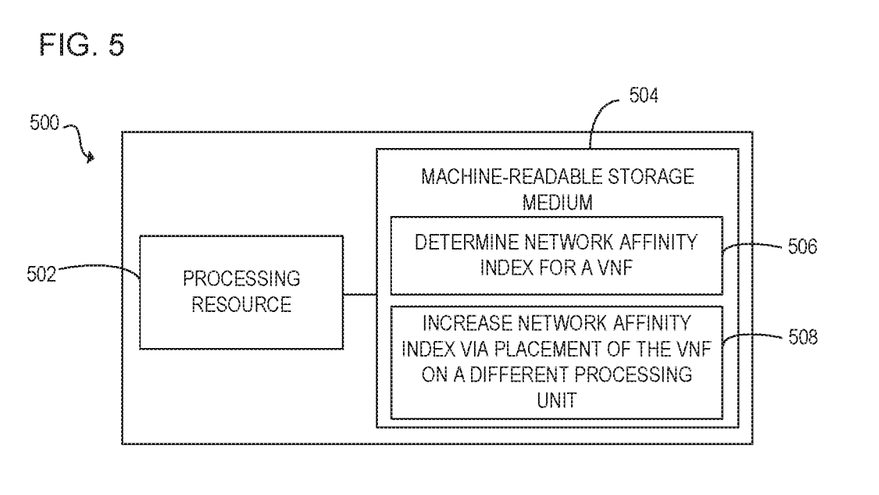
FIG. 5 is a block diagram of an example computing device with a processing resource to execute instructions in a machine-readable storage medium for increasing a network affinity index via placement of a VNF from one processing unit to another processing unit in accordance with the present disclosure.
Figure 6:
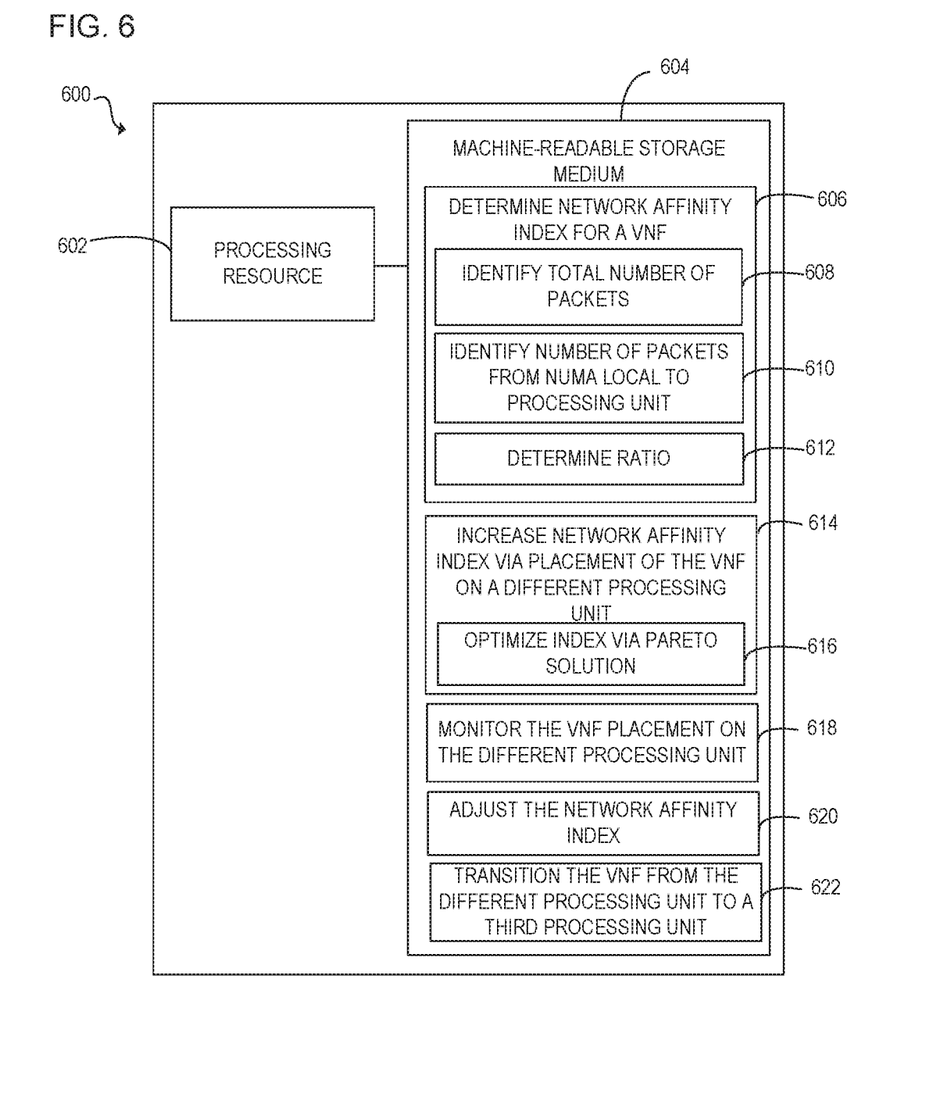
FIG. 6 is a block diagram of an example computing device with a processing resource to execute instructions in a machine-readable storage medium for determining a network affinity index for a given VNF via identification of a total number of packets received by the given VNF and a number of packets from a memory zone local to a processing unit in accordance with the present disclosure.

Referring now to FIGS. 5-6, example block diagrams of networking devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of networking device 500 with processing resource 502 to execute instructions 506-508 within machine-readable storage medium 504. Although networking device 500 includes processing resource 502 and machine-readable storage medium 504, it may also include other components that would be suitable to one skilled in the art. For example, networking device 500 may include a controller, memory storage, or other suitable type of component. The networking device 500 is an electronic device with processing resource 502 capable of executing instructions 506-508 and as such embodiments of the networking device 500 include a computing device such as a server, switch, router, wireless access point (WAP), or other type of networking device or embodiments of the networking device 500 include an electronic device such as a computing device, or other type of electronic device capable of executing instructions 506-508. The instructions 506-508 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-508 to increase a network affinity index for a given VNF. Specifically, the processing resource 502 executes instructions 506-508 to: determine for the given VNF, the network affinity index over a period of time, the network affinity index identifies a number of packets received by the VNF from a non-uniform memory access (NUMA) local to a first processing unit hosting the VNF; and increase the network affinity index via placement of the VNF from the first processing unit hosting the VNF to a second processing unit local to the NUMA.

The machine-readable storage medium 504 includes instructions 506-508 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of networking device 500.

FIG. 6 is a block diagram of networking device 600 with processing resource 602 to execute instructions 606-622 within machine-readable storage medium 604. Although networking device 600 includes processing resource 602 and machine-readable storage medium 604, it may also include other components that would be suitable to one skilled in the art. For example, computing device 600 may include a controller, memory storage, or other suitable type of component. The networking device 600 is an electronic device with processing resource 602 capable of executing instructions 606-622 and as such embodiments of the networking device 600 include an electronic device such as a server, switch, router, wireless access point (WAP), or other type of computing device. Other embodiments of the networking device 600 include an electronic device such as a computing device, or other type of electronic device capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-622 to increase a network affinity index via placement of the VNF from one processing unit to another processing unit in closer proximity to a NUMA. Specifically, the processing resource 602 executes instructions 606-622 to: determine the network affinity index for the VNF by identifying a total number of packets received by the VNF, identifying a number of packets from a NUMA local to the processing unit hosting the VNF, and determining a ratio between number of packets from the NUMA and the total number of packets to obtain the network affinity index; increase the network affinity index via placement of the VNF from one processing unit to a different processing unit; optimize the network affinity index through use of a pareto solution that indicates the optimal location or placement of the VNF; monitor the VNF placement of the different processing unit, re-determine a new network affinity index for a different period of time; and transition the VNF from the different processing unit to another processing unit (e.g., third processing unit).

The machine-readable storage medium 604 includes instructions 606-622 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 502 to fetch, decode, and/or execute instructions of machine-readable storage medium 604. The application and/or firmware may be stored on machine-readable storage medium 604 and/or stored on another location of networking device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a network controller, the method comprising:
   determining, for a virtualized network function (VNF), a first network affinity index over a first period of time that identifies a first number of network packets received by the VNF from a first data locality on a server, the first network affinity index corresponding to a first processing unit initially hosting the VNF and the first data locality; and
   identifying a placement of the VNF with respect to a second processing unit extrinsic to the first processing unit to increase upon the first network affinity index relative to a second network affinity index corresponding to the second processing unit and the first data locality;
   relocating the VNF from the first processing unit to the second processing unit, wherein the second processing unit and the first processing unit are located with a same server and the second processing unit is local to the first data locality.

2. The method of claim 1 wherein determining, for the VNF, the first network affinity index comprises:
   identifying a total number of network packets received by the VNF over the first period of time; and
   identifying a second number of network packets, received by the VNF that correspond to a second data locality local to the first processing unit hosting the VNF over the first period of time; and
   determining a ratio of the second number of network packets over the total number of network packets.

3. The method of claim 1, further comprising:
   placing future network packets received after the first period of time and prior to relocation in a second data locality corresponding to the first processing unit initially hosting the VNF.

4. The method of claim 1, further comprising:
   re-determining the first network affinity index associated with the VNF and the first processing unit over a different period of time after the first period of time.

5. The method of claim 1 wherein identifying the placement of the VNF to increase upon the first network affinity index comprises:
   improving the network efficiency index via identification of a different processing unit local to the first data locality initially hosting the VNF.

6. The method of claim 1, further comprising:
   configuring parameters of the VNF via an Ethernet interface to relocate the VNF from the first processing unit to the second processing unit.

7. The method of claim 1 wherein the placement of the VNF to increase upon the first network affinity index results in an expense to other VNFs within the same server.

8. A server including:
   one or more processing units;
   a set of Virtualized Network Functions (VNFs), each instance of a VNF from the set of VNFs located on a respective processing unit of the one or more processing units in the server; and
   an orchestrator functional component executing on at least one of the one or more processing units, the orchestrator to:
   for each instance of the VNF, determine a network affinity index that identifies a number of network packets received by a given VNF from a memory zone local to one of the one or more processing units hosting the given VNF; and
   increase the network affinity index via identification of a placement and relocation of the given VNF from a first of the one or more processing units hosting the given VNF to a different processing unit among the one or more processing units, the different processing unit closer in proximity to the memory zone.

9. The server of claim 8, wherein at least two different instances of VNFs from the set of VNFs are hosted on a single one of the one or more processing units.

10. The server of claim 8, wherein the orchestrator proceeds to increase the network affinity index for each of the set of VNFs via relocation of at least two instances of the set of VNFs from a currently hosting processing unit among the one or more processing units to a different processing unit among the one or more processing units.

11. The server of claim 8, wherein for each instance of the VNF to determine the network affinity index for the given VNF, the orchestrator is further to:
    determine a total number of network packets received by the given VNF;
    determine a number of network packets received by the given VNF corresponding to the memory zone; and
    determine a ratio of the number of network packets over the total number of packets.

12. The server of claim 8, further comprising:
    an optimizer to optimize the network affinity index via a pareto solution.

13. A non-transitory machine-readable storage medium comprising instructions that when executed by a processing resource cause a networking device to:
    determine, for a virtualized network function (VNF), a network affinity index over a period of time that identifies a number of network packets received by the VNF from a non-uniform memory access (NUMA) local to a first processing unit hosting the VNF; and increase the network affinity index via relocation of the VNF from the first processing unit to a second processing unit local to the NUMA, the first processing unit and the second processing unit located in a single server.

14. The non-transitory machine-readable storage medium of claim 13 wherein to determine, for the VNF, the network affinity index over the period of time that identifies the number of network packets received by the VNF from the NUMA local to the first processing unit hosting the VNF comprises:
   identify a total number of network packets received by the VNF;
   identify the number of network packets received by the VNF from the NUMA local to the first processing unit; and
   determine a ratio of the number of network packets received from the NUMA over the total number of packets.

15. The non-transitory machine-readable storage medium of claim 13 comprising instructions that when executed by the processing resource cause the computing device to:
   adjust the network affinity index over a different period of time corresponding to the number of network packets received by the VNF from a different NUMA; and
   based on the adjusted network affinity index, relocate the VNF from the second processing unit to a third processing unit local to the different NUMA.

16. The non-transitory machine-readable storage medium of claim 15 wherein the network affinity index takes into account network traffic distribution to the VNF.

17. The non-transitory machine-readable storage medium of claim 13 wherein the instructions to cause the networking device to increase the network affinity index further include instructions that when executed by the processing resource cause the networking device to:
   optimize the network affinity index via a pareto solution.

* * * * *